United States Patent
Bredow et al.

(10) Patent No.: US 7,965,204 B2
(45) Date of Patent: Jun. 21, 2011

(54) PORTABLE RADIO REMOTE CONTROL TRANSMITTER

(75) Inventors: Wolfgang Bredow, Niefern-Oeschelbronn (DE); Thomas Burchard, Pforzheim (DE)

(73) Assignee: NBB Controls + Components AG, Oelbronn-Duerrn (DE)

( * ) Notice: Subject to any disclaimer, the term of this patent is extended or adjusted under 35 U.S.C. 154(b) by 991 days.

(21) Appl. No.: 11/824,603

(22) Filed: Jun. 29, 2007

(65) Prior Publication Data

US 2008/0012747 A1 Jan. 17, 2008

(30) Foreign Application Priority Data

Jul. 1, 2006 (EP) ...................................... 06013696

(51) Int. Cl.
*H03M 11/00* (2006.01)
(52) U.S. Cl. ............ 341/20; 341/22; 341/176; 345/170; 200/310; 200/311; 200/314
(58) Field of Classification Search .................... 341/20, 341/22, 173, 176; 200/5 A, 314, 310, 311; 455/566; 345/170
See application file for complete search history.

(56) References Cited

U.S. PATENT DOCUMENTS

| | | | | |
|---|---|---|---|---|
| 5,847,336 | A * | 12/1998 | Thornton | 200/5 A |
| 6,310,609 | B1 * | 10/2001 | Morgenthaler | 345/170 |
| 6,608,271 | B2 * | 8/2003 | Duarte | 200/311 |
| 7,120,471 | B2 * | 10/2006 | Deeds | 455/566 |
| 7,244,899 | B2 * | 7/2007 | Jung et al. | 200/314 |
| 7,294,802 | B2 * | 11/2007 | Yurochko | 200/310 |
| 2005/0248930 | A1 | 11/2005 | Naval et al. | |

FOREIGN PATENT DOCUMENTS

| | | |
|---|---|---|
| DE | 84 13 936 | 11/1984 |
| DE | 42 36 062 | 4/1993 |
| DE | 100 31 665 | 1/2002 |
| EP | 0 685 954 | 12/1995 |
| EP | 1 583 122 | 10/2005 |

* cited by examiner

*Primary Examiner* — Albert K Wong
(74) *Attorney, Agent, or Firm* — Lipsitz & McAllister, LLC

(57) ABSTRACT

The invention relates to a portable radio remote control transmitter with a splash-proof and dust-tight housing, which accommodates a control unit and comprises an operator control panel with a number of buttons for entering control commands. In order to develop the radio remote control transmitter in such a way that the risk of erroneous operation is reduced, it is proposed according to the invention that at least one button has an associated illuminating element for illuminating the button.

9 Claims, 1 Drawing Sheet

PORTABLE RADIO REMOTE CONTROL TRANSMITTER

The present disclosure relates to the subject matter disclosed in European application number 06013696.7 of Jul. 1, 2006, which is incorporated herein by reference in its entirety and for all purposes.

BACKGROUND OF THE INVENTION

The invention relates to a portable radio remote control transmitter with a splash-proof and dust-tight housing, which accommodates a control unit and comprises an operator control panel with a number of buttons for entering control commands.

Portable radio remote control transmitters of this type are used for example for the remote control of industrial and agricultural machinery, in particular forestry machinery. They are also used for the remote control of superstructures mounted on trucks, as used for example by the fire service. The radio remote control transmitter has a number of buttons, which can be actuated for entering control commands. The commands are transmitted from the control unit via a radio link to a receiver that is associated with the radio remote control transmitter. The buttons usually carry an identifying element, for example a pictogram, which illustrates the respective control command that is transmitted by actuating the button. To operate the radio remote control transmitter, it is therefore necessary for the operator to satisfactorily recognize the identifying elements, since otherwise there is the risk of the radio remote control transmitter being operated erroneously.

It is an object of the present invention to develop a portable radio remote control transmitter of the type mentioned at the beginning in such a way that the risk of erroneous operation of the radio remote control transmitter is reduced.

SUMMARY OF THE INVENTION

This object is achieved according to the invention in the case of a portable radio remote control transmitter of the type mentioned at the beginning by at least one button having an associated illuminating element for illuminating the button.

By illuminating at least one button, for example an OFF button, with which the transmitter can be switched off, or an ON button, with which the transmitter can be switched on, the risk of erroneous operation can be reduced considerably. This applies in particular to use of the radio remote control transmitter at night or in poorly illuminated conditions.

In the case of a configuration of the radio remote control transmitter according to the invention that is of a particularly simple construction, the at least one illuminating element is disposed in the housing on a printed circuit board. A light-emitting diode, fixed on the printed circuit board, is preferably used as the illuminating element.

It may be provided that a number of buttons, in particular all the buttons, of the radio remote control transmitter can be illuminated by means of a single illuminating element. However, it is of advantage if the radio remote control transmitter has a number of illuminating elements, which are respectively associated with one or more buttons. This makes more uniform illumination of the buttons possible and additionally provides the possibility of illuminating the buttons differently in accordance with their actuation. Furthermore, differently colored illuminating elements can be used.

In particular, it may be provided that at least one illuminating element is associated with each button.

It is advantageous if a number of differently colored illuminating elements are associated with at least one button, since this makes handling of the radio remote control transmitter easier. For example, different illuminating elements may be activated according to the control command that has been entered.

In the case of a preferred embodiment, the radio remote control transmitter has a sealing element, which embraces a printed circuit board and is formed to be translucent, at least in some regions thereof, for example is produced from a translucent material. This provides the possibility of disposing the illuminating element in the region of the printed circuit board that is embraced by the sealing element, so that the illuminating element is protected in simple manner from splash water and dust, and at the same time the light radiation emanating from the illuminating element can be directed through the sealing element onto the associated button.

It may also be provided that a light guide is associated with the at least one illuminating element, in order to guide the light radiation emanating from the illuminating element to the associated button.

It is advantageous if at least one button is formed to be translucent, at least in some regions thereof, for example is produced from a translucent material. This makes it possible for light to shine through the button. The button may carry an identifying element, for example a pictogram, a letter and/or a number.

Preferably a snap-action element is associated with at least one button, which element is disposed on the printed circuit board and is adapted to be transformed from a first, mechanically stable form into a second form by exerting an actuating force, an illuminating element being disposed next to the snap-action element.

The use of a snap-action element makes it possible for actuation of the button to be perceived particularly distinctively. The snap-action element may, for example, be configured as a snap-action disk, which is transformed from a stable form into a mechanically unstable form by exerting an actuating force, so that it automatically resumes its stable form when the actuating force is no longer applied. The changing of the form of the snap-action element allows a switching contact that is associated with the button to be opened and closed in simple manner. Disposed next to the snap-action element is an illuminating element, with which the button associated with the snap-action element can be illuminated.

It is of advantage if a sealing element embracing the printed circuit board is formed as a switching mat, which on its underside carries a projection associated with a snap-action element and on its upper side carries a button, and is formed to be translucent, at least in some regions thereof, for example is formed from a translucent material. The switching mat carries the buttons of the operator control panel and, when a button is actuated, is pressed by its associated projection against the snap-action element interacting with the button, so that said snap-action element changes its form and, as a result, a switching contact can be closed.

Particularly easy handling is achieved in the case of an advantageous embodiment of the radio remote control transmitter according to the invention by actuation of one button allowing a number of buttons to be illuminated. In particular, it may be provided that all the buttons of the operator control panel can be illuminated by actuation of one button.

The illumination of the buttons may be continuous. For example, it may be provided that, when the radio remote control transmitter is switched on, all the buttons of the operator control panel are automatically illuminated until the radio remote control transmitter is switched off again.

As an alternative or in addition, it may be provided that actuation of one button allows a number of buttons of the operator control panel to be illuminated for a predetermined illuminating time. For example, the at least one illuminating element may be controllable in such a way that all the buttons of the operator control panel can be illuminated for a predeterminable illuminating time by actuation of one button. After the illuminating time has elapsed, the illumination of the buttons is automatically switched off again.

It is advantageous if, after actuation of a button, the illuminating time can be re-started by renewed actuation of a button. If a first button is actuated, the buttons are illuminated for an illuminating time of, for example, 20 seconds. If the first button or another button is actuated again during these 20 seconds, the illuminating time is re-started, i.e. the buttons are illuminated again for a further 20 seconds.

In the case of a particularly preferred embodiment, all the buttons of the operator control panel can be illuminated, preferably for a predeterminable time, by actuation of any button. This makes possible particularly easy handling of the radio remote control transmitter, even when visibility is poor. If any button is pressed, all the buttons of the operator control panel light up, for example for 20 seconds, and as a result can be clearly recognized by the operator.

It is of particular advantage if the illuminating time can be predetermined by the user.

The following description of a preferred embodiment of the invention serves for a more detailed explanation in conjunction with the drawings.

DETAILED DESCRIPTION OF THE INVENTION

Figure 1:
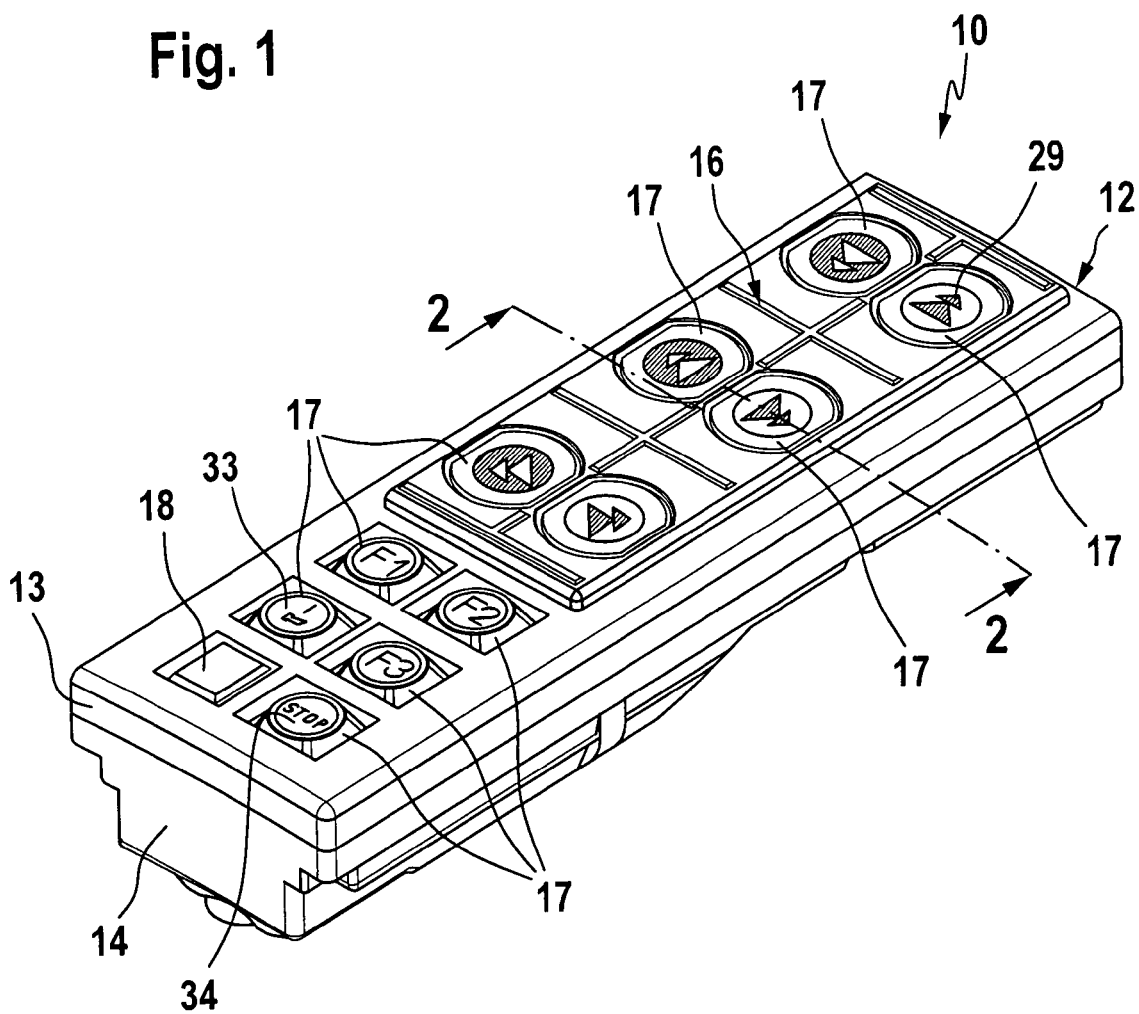
FIG. 1 shows a perspective representation of a portable radio remote control transmitter according to the invention.
Figure 2:
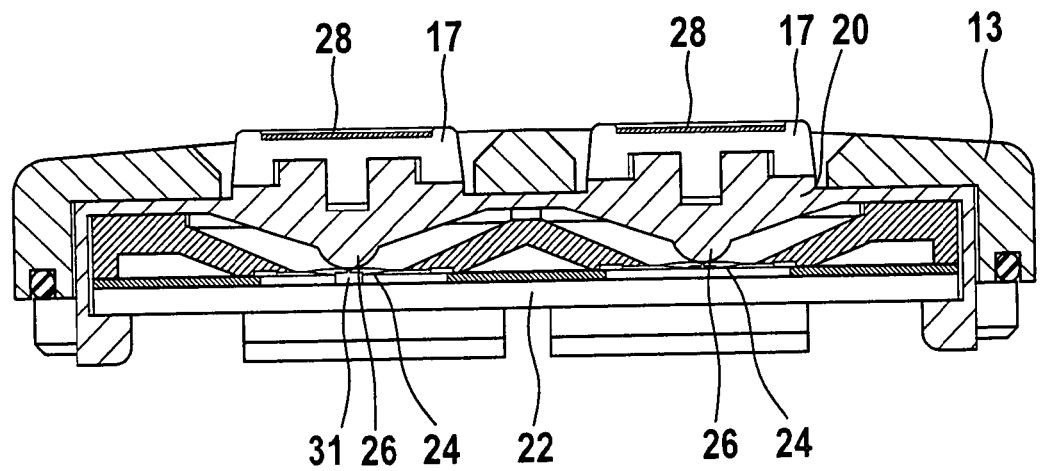
FIG. 2 shows a partial sectional view along the line 2-2 in FIG. 1.

In the drawing, a portable radio remote control transmitter that is designated overall by the reference numeral 10 is schematically represented, having a two-part housing 12, which comprises an upper housing shell 13 and a lower housing shell 14. The upper housing shell 13 forms a cover and carries an operator control panel 16 with a number of buttons 17 and with an electrical display element 18 in the form of a 7-segment display. The buttons 17 are disposed on the upper side of a flexible sealing element, which is formed as a switching mat 20 and embraces a printed circuit board 22 positioned inside the housing 12. The printed circuit board 22 is disposed between the upper and lower housing shells 13 and 14. To achieve a better overview, the lower housing shell 14 is not represented in FIG. 2.

Aligned with the buttons 17, the printed circuit board 22 carries contact elements in the form of snap-action disks 24, which are adapted to be transformed from a first, mechanically stable form into a second, mechanically unstable form by exerting an actuating force. Respectively associated with a snap-action disk 24, the switching mat 20 has on its underside a spherical projection 26, which is disposed in alignment with the respective button 17. Consequently, the switching mat 20 can be deformed by actuation of a button 17 and, as a result, the associated snap-action disk 24 can be transformed into its unstable form, in which it connects contact areas disposed on the printed circuit board 22 to one another in a conducting manner and thereby closes a switching contact.

The lower housing shell 14 accommodates a control unit, which is known per se and, to achieve a better overview, is therefore not represented in the drawing, is connected to the contact areas that are associated with the snap-action disks 24 and has a transmitting element for emitting radio signals. By actuation of a button 17, a control command associated with said button can consequently be transmitted wirelessly to a receiver that is associated with the radio remote control transmitter 10.

The buttons 17 respectively carry on their upper side an identifying element in the form of a sticker 28, on which a pictogram 29 or a combination of letters and/or numbers is printed.

Disposed next to the projections 26 on the upper side of the printed circuit board 22 are a multiplicity of illuminating elements in the form of light-emitting diodes 31, which are respectively associated with a button 17. The switching mat 20 and the buttons 17 are produced from a translucent material, so that the light radiation emanating from the light-emitting diodes 31 can pass through the switching mat 20 and the buttons 17 and emerge from the housing 12 on the upper side. The respective buttons 17 are thereby illuminated. The pictograms 29 and similarly the inscription on the buttons 17 can consequently be recognized well by the user, even in poor visibility conditions.

One of the buttons 17 forms an ON button 33, by actuation of which the radio remote control transmitter 10 can be switched on. This has the consequence that all the light-emitting diodes 31 light up for a predetermined illuminating time, which may for example be 20 seconds, and consequently all the buttons 17 can be recognized well. After the illuminating time has elapsed, the power supply to the light-emitting diodes 31 is automatically interrupted, unless a button 17 is actuated again within the illuminating time. If the latter is the case, the illuminating time is re-started. As an alternative, it may be provided that actuation of the on button 33 has the effect that the light-emitting diodes 31 light up until the radio remote control transmitter 10 is switched off by means of an OFF button 34. The control of the light-emitting diodes is performed by the control unit, which for reasons of a better overview is not represented in the drawing.

The radio remote control transmitter 10 according to the invention is consequently distinguished by very easy handling, the risk of erroneous operation being reduced since all the buttons 17 can be illuminated by means of the light-emitting diodes 31.

The invention claimed is:

1. Portable radio remote control transmitter, comprising:
   a splash-proof and dust-tight housing,
   a control unit accommodated within the housing, the control unit comprising an operator control panel with a number of buttons for entering control commands,
   a printed circuit board,
   a sealing element, which partially surrounds the printed circuit board and is formed to be translucent, at least in some regions thereof,
   at least one illuminating element disposed on the printed circuit board in a region of the printed circuit board surrounded by the sealing element, the at least one illuminating element being associated with at least one of the buttons for illuminating the at least one button.

2. Portable radio remote control transmitter according to claim 1, wherein the radio remote control transmitter has a number of illuminating elements, which are associated with one or more of the buttons.

3. Portable radio remote control transmitter according claim 1, wherein the at least one illuminating element is associated with each button.

4. Portable radio remote control transmitter according to claim 1, wherein at least one of the buttons is formed to be translucent, at least in some regions thereof.

5. Portable radio remote control transmitter according to claim 1, wherein a snap-action element is associated with at least one of the buttons, which element is disposed on the printed circuit board and is adapted to be transformed from a first, mechanically stable form into a second form by exerting an actuating force, one of the at least one illuminating elements being disposed next to the snap-action element.

6. Portable radio remote control transmitter according to claim 1, wherein actuation of one of the buttons allows a number of the buttons of the operator control panel to be illuminated.

7. Portable radio remote control transmitter according to claim 1, wherein actuation of one of the buttons allows a number of the buttons of the operator control panel to be illuminated for a predetermined illuminating time.

8. Portable radio remote control transmitter according to claim 7, wherein after actuation of a first button, renewed actuation of any of the buttons allows the illuminating time to be re-started.

9. Portable radio remote control transmitter according to claim 6, wherein actuation of any of the buttons allows all the buttons of the operator control panel to be illuminated.

* * * * *